United States Patent [19]

Strehl

[11] Patent Number: 4,616,361
[45] Date of Patent: Oct. 7, 1986

[54] DIGITAL SIGNAL AND MULTIPLEX DEVICE

[75] Inventor: Herbert Strehl, Munich, Fed. Rep. of Germany

[73] Assignee: Siemens Aktiengesellschaft, Berlin & Munich, Fed. Rep. of Germany

[21] Appl. No.: 602,205

[22] Filed: Apr. 19, 1984

[30] Foreign Application Priority Data

May 10, 1983 [DE] Fed. Rep. of Germany ....... 3317116

[51] Int. Cl.[4] .............................................. H04J 3/12
[52] U.S. Cl. ............................................... 370/110.1
[58] Field of Search ..................... 370/110.1, 102, 112; 371/37, 48, 47, 49, 50

[56] References Cited

PUBLICATIONS

"The Design and Applications of PCM Signalling Multiplexers", by E. Blum et al., Budavox Telecomm Rev. (Hungary), #3 (1979).
"64 kbit/s Data Adaptation Unit for 2048 kbit/s PCM Terminals", by R. Trachsel, Hasler Review, vol. 12, No. 3/4, 1979.
"Multiplex Equipment DSMX64K/2 and Insertion Unit DSE64K/2 for Digital Transmission", Graf et al., Special Issue Digital Transmission, telcom report 2 (1979), pp. 45-51, 59-64.
CCITT Yellow Book, vol. III Fascicle III.3 "Digital Networks, Transmission Systems and Multiplexing Eqipment", Recommendation G.751, pp. 144-145.
"Coding for Error Correction and Error Detection," Swoboda, (1973), pp. 12-15.
"Best Fire Codes with Length up to 1200 Bits", Wagner, IEEE Transactions, IT-16 (1970), pp. 649-650.
"Advanced Mico Devices Preliminary Product Specification for Am9520 Burst Error Processor," Feb. 1981.

Primary Examiner—Douglas W. Olms
Assistant Examiner—Kenneth I. Rokoff

[57] ABSTRACT

A digital signal multiplex device has at least one multiplexer and at least one demultiplexer for pulse frames having a number of useful information channels. The transmitter has a data protection coder and the receiver has a data protection decoder. The data protection coder generates an error protection code and inserts the error protection information into one or more of the useful information channels or into whole-numbered portions of at least one useful information channel in the pulse frame. At the receiving end, the error protection information-containing portion of the signal is supplied to the data protection decoder, which recognizes and corrects errors in all or certain of the channels of the transmitted time division multiplex signal. In this manner, all or individual ones of the useful information channels, which may be utilized for data transmission, can be transmitted with a lower bit error quota without departing from the standardized hierarchy stages of data transmission systems.

10 Claims, 6 Drawing Figures

DIGITAL SIGNAL AND MULTIPLEX DEVICE

BACKGROUND OF THE INVENTION

1. Field of the Invention

The present invention relates to a digital signal multiplex device having at least one multiplexer and at least one demultiplexer for pulse frames having a number of useful information channels, and in particular to such a device having an error protection coder and decoder.

2. Description of the Prior Art

Digital signal multiplex systems employing at least one multiplexer and at least one demultiplexer for pulse frames which have a number of useful information channels are described, for example, in the Special Issue/Digital Transmission of "Telcom-Report," 2 (1979) at pages 45–61 and 59–64. Pulse frames or formats for this purpose are described in the CCITT Yellow Book, Volume III, Fascicle III.3, "Digital Networks, Transmission Systems and Multiplexing Equipment," Recommendation G.751, pages 144–145.

In modern analog telecomunications networks, approximately ten percent of the transmission capacity is utilized for data transmission. A similar level may also be expected in future digital telecommunications networks. For purpose of economy, the transmission quality of the analog telecomunications networks has been adapted to the requirements of telephone traffic. Data transmission requires a considerably higher transmission quality than has heretofore been employed, the higher quality including, for example, coding and data protection in the terminal devices.

For the same reasons of economy, future digital telecommunications networks will also be adapted to the requirements of telephone traffic. For transmitting data signals and video signals, provisions will also be required in digital telecommunications networks to ensure the improved transmission quality required for such signals. It is possible to utilize known methods in association with data transmission for this purpose, such as an appropriately error-insenstive coding in the terminal device.

As described in "Coding for Error Correction and Error Recognition," Swoboda, 1973, data protection can be achieved by converting a source code into a redundant representation utilizing more binary digits. The coding of the information by code words having a fixed length of n digits is known as block coding. The n digits contain m information digits and k check or parity digits. The latter are determined on the basis of the m information digits in accordance with a predetermined rule, namely the error protection code. The receiver recognition and/or correction of faulty code words and the conversion of the information items into the original source code is referred to herein as decoding.

One such conventional error protection code is the so-called F code described in IEEE Transactions, IT-16 (1970) 9, pages 649–650.

SUMMARY OF THE INVENTION

It is an object of the present invention to provide a means for obtaining higher transmission quality in a digital telecommunications network while maintaining the transmission quality suited for telephone traffic, such that lower bit era quotas can be achieved for the data transmission channels without departing from the standardized hierarchy levels for such transmission systems.

The above object is inventively achieved in a system having a digital signal multiplex device with at least one multiplexer and at least one demultiplexer for pulse frames or formats having a number of useful information channels, with a data protection coder being assigned to the multiplexer and filling one or more than one of the useful information channels (or whole-numbered parts of at least one useful information channel) with data protection information. A data protection decoder is provided at the receiver which is assigned to the demultiplexer, the data protection decoder being supplied with the data protection information and undertaking error correction.

It is preferable if the data protection coder and decoder each derive their block synchronization from the frame synchronization of the multiplexer and the demultiplexer.

In the digital signal multiplex device constructed in accordance with the principles of the present invention, basically all known error protection codes may be utilized for data protection purposes. Block codes may, however, be better adapted to the block structure of the pulse frame and to the synchronization.

The digital signal multiplex device disclosed herein permits, for example, individual 34 Mbit/s groups having considerably lower bit error quotas (for example, $10^{-10}$) to be obtained in digital telecommunications networks of the type which may be expected to be constructed in the future with transmission systems designed for telephone traffic. It is possible for the protected data groups to be inserted by known multiplexers into transmission systems having higher hierarchy stages such as 140 Mbit/s.

Cascading of digital signal multiplex devices in accordance with the principles of the present invention into even higher hierarchy stages results in even better transmission quality. Systems in which such cascading may be employed to advantage are, for example, cable transmission systems, radio relay transmission systems, satellite transmission systems, and light waveguide transmission systems.

In digital telephone networks of the type which may be expected in the future, employment of the principles of the present invention permits a portion of the channels to be connected, for example, for data traffic of a higher transmission quality without changing the quality of the transmission devices themselves. As a result of this type of data protection, at the expense of a small portion of the channel capacity (for example, six percent), significantly improved channel quality results without departing from standardized hierarchy levels.

DESCRIPTION OF THE PREFERRED EMBODIMENTS

Figure 1:
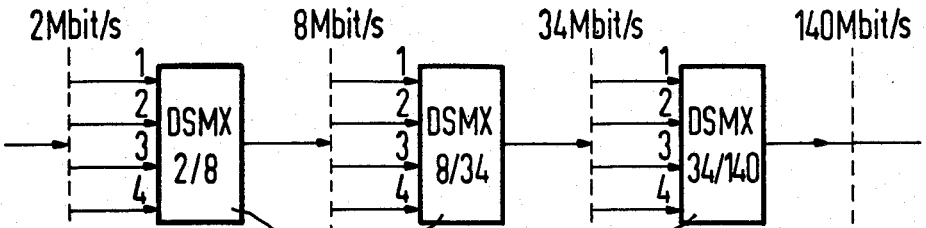
FIG. 1 is a schematic block diagram of a cascaded system of conventional digital signal multiplex devices.

A series of cascaded conventional digital signal multiplex devices is shown in FIG. 1. The digital signal multiplex device DSMX 2/8 converts four 2 Mbit/s signals into an 8 Mbit/s signal, the digital signal multiplex device DSMX 8/34 converts four 8 Mbit/s signals into a 34 Mbit/s signal, and the digital signal multiplex device DSMX 34/140 converts four 34 Mbit/s signals into a 140 Mbit/s signal.

Figure 2:
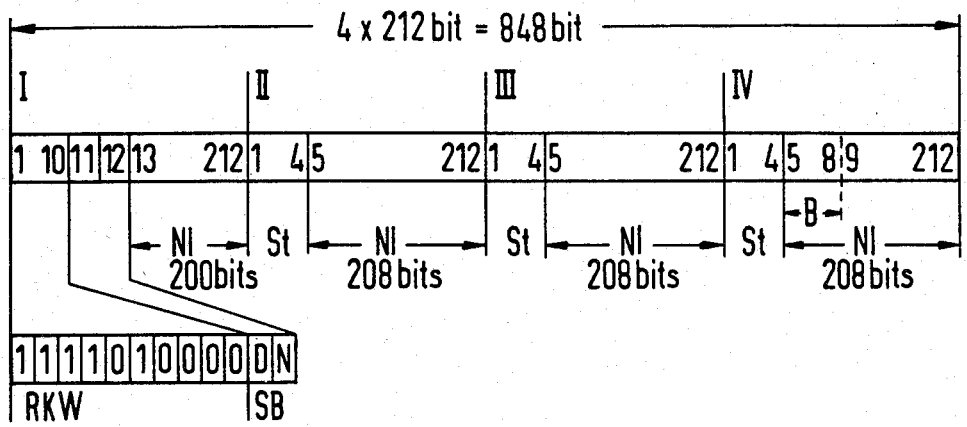
FIG. 2 shows a pulse frame or format for an 8-Mbit/s digital signal.
Figure 3:
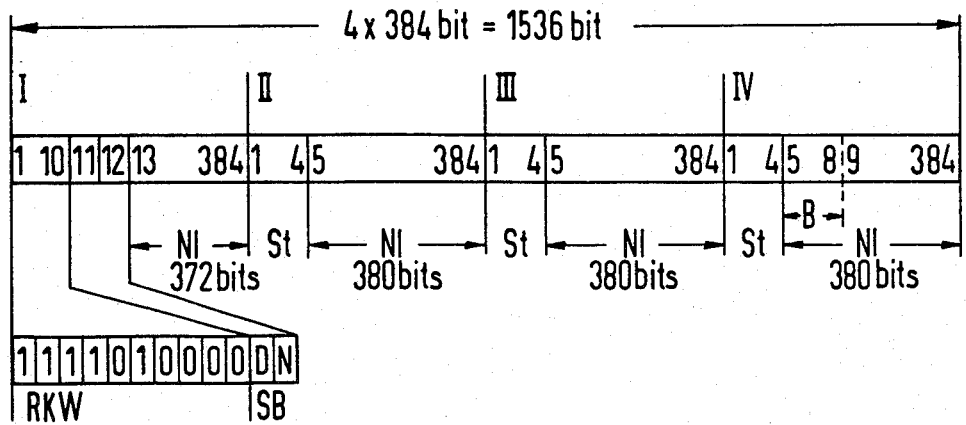
FIG. 3 represents a pulse frame or format for a 34-Mbit/s digital signal.

The pulse frame or format for the 8 Mbit/s digital signal, standardized by the CCITT, is shown in FIG. 2, and the format for the 34 Mbit/s digital signal is shown in FIG. 3. Each pulse frame is divided into four blocks I, II, III, and IV. Useful information channels are references NI, items of stuffing information are references St, stuffing or information bits are referenced B, frame code words are references RKW, and service bits are referenced SB. The digits in the block signify bits.

Figure 4:
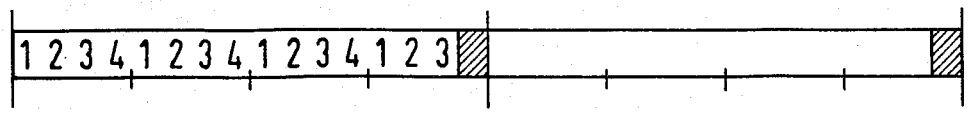
FIG. 4 represents a portion of a 34-Mbit/s pulse frame or format with data protection information.

The format shown in FIG. 4 demonstrates the use of a 2 Mbit/s channel for data protection information. If, in FIG. 1, an item of data protection information is supplied to the fourth input of the digital signal multiplex device DSMX 2/8, that is, into the useful information channel NI of block IV of the pulse frame shown in FIG. 2, this information appears at the shaded locations in the 34 Mbit/s multiplex frame which is partially shown in FIG. 4.

A first embodiment of a system constructed in accordance with the principles of the present invention is shown in FIG. V wherein components 1 through 3 constitute the transmitting portion of the system and components 5 through 10 constitute the receiving portion. The transmitting portion and the receiving portion are connected by a transmission means 4, which may be, for example, a chain of transmission systems. The digital signal multiplex devices 1 and 10 are respectively known DSMX 64K/2 and DSMX 2/64K devices described in the aforementioned "Telcom Report." The digital signal multiplex devices 2 and 9 are respectively DSMX 2/8 and DSMX 8/2 devices described in the same publication. The output of the digital signal multiplex device 2 is supplied to a data protection coder 3. The receiving portion of the system has a decoder subsystem consisting of a data protection decoder 5, a correction circuit 6, a delay circuit 7, and an adder 8. The data protection coder 3 and the data protection decoder 5 are integrated circuits of the type described in the data handbook Am 9520 of Advanced Micro Devices, Inc. published in February 1981.

Figure 5:
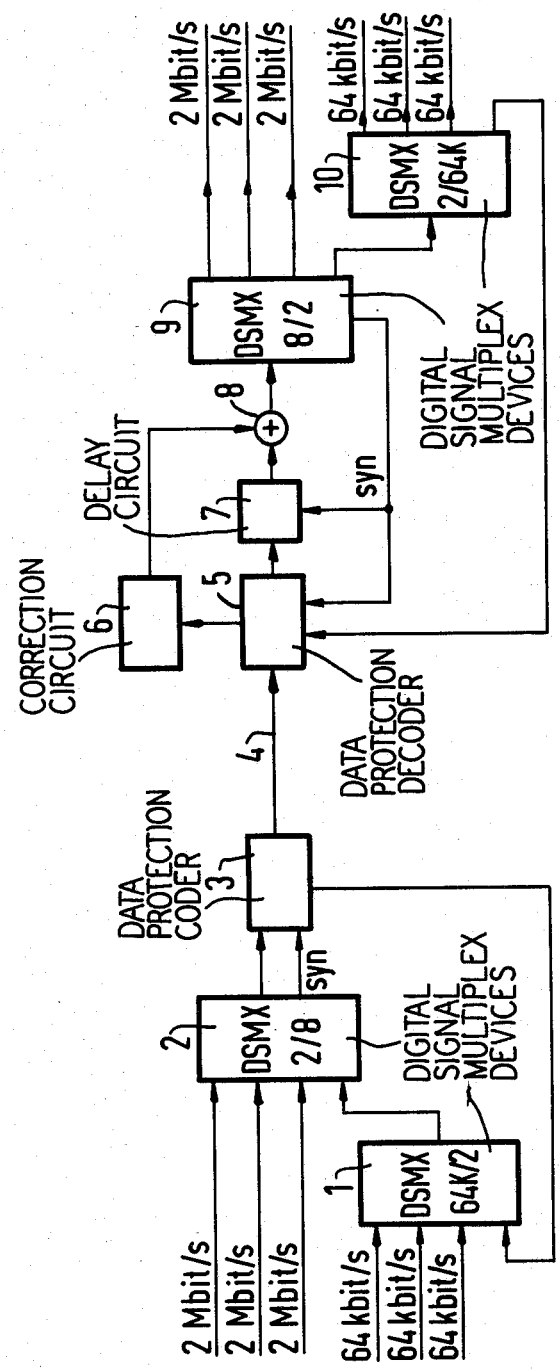
FIG. 5 is a schematic block diagram of a first embodiment of a digital signal multiplex device constructed in accordance with the principles of the present invention.

The lines of the transmitting and receiving portions of the system shown in FIG. 5 referenced syn transmit synchronizing signals.

The digital signal multiplex device 1 is supplied with three 64 kbit/s signals and the digital signal multiplex device 2 is supplied with three 2 Mbit/s signals and the 2 Mbit/s output signal of the digital signal multiplexer 1. The output signal of the digital signal multiplex device 2 is supplied to the data protection coder 3. From one or more of the interlaced input signals, the data protection coder 3 derives protection bits which are supplied, as a 64 Kbit/s signal, to the digital signal multiplex device 1 and, following formation of the output signal of the digital signal multiplex device 2, find their place in the shaded panels shown in FIG. 4. To enable error correction to be undertaken at the receiving portion of the system, the useful signal is delayed in relation to the data protection information, by one or more data protection block lengths.

At the receiving portion of the system, the data and data protection information are supplied to the data protection decoder 5, and from there to the correction circuit 6 and the delay circuit 7. The sum of the outputs of the delay circuit 7 and the correction circuit 6 are supplied through an adder 8 to the digital signal multiplex device 9. In the multiplex device 9 and in the digital signal multiplex device 10 (to which one output of the device 9 is supplied) the data protection information is separated and is supplied to the decoder 5. Parallel in time, the transmitted data and the data protection information are supplied to the correction circuit 6 which investigates the data and data protection information for errors. Through the adder 8, the output signals from the correction circuit 6 correct any errors in the main information flow.

Figure 6:
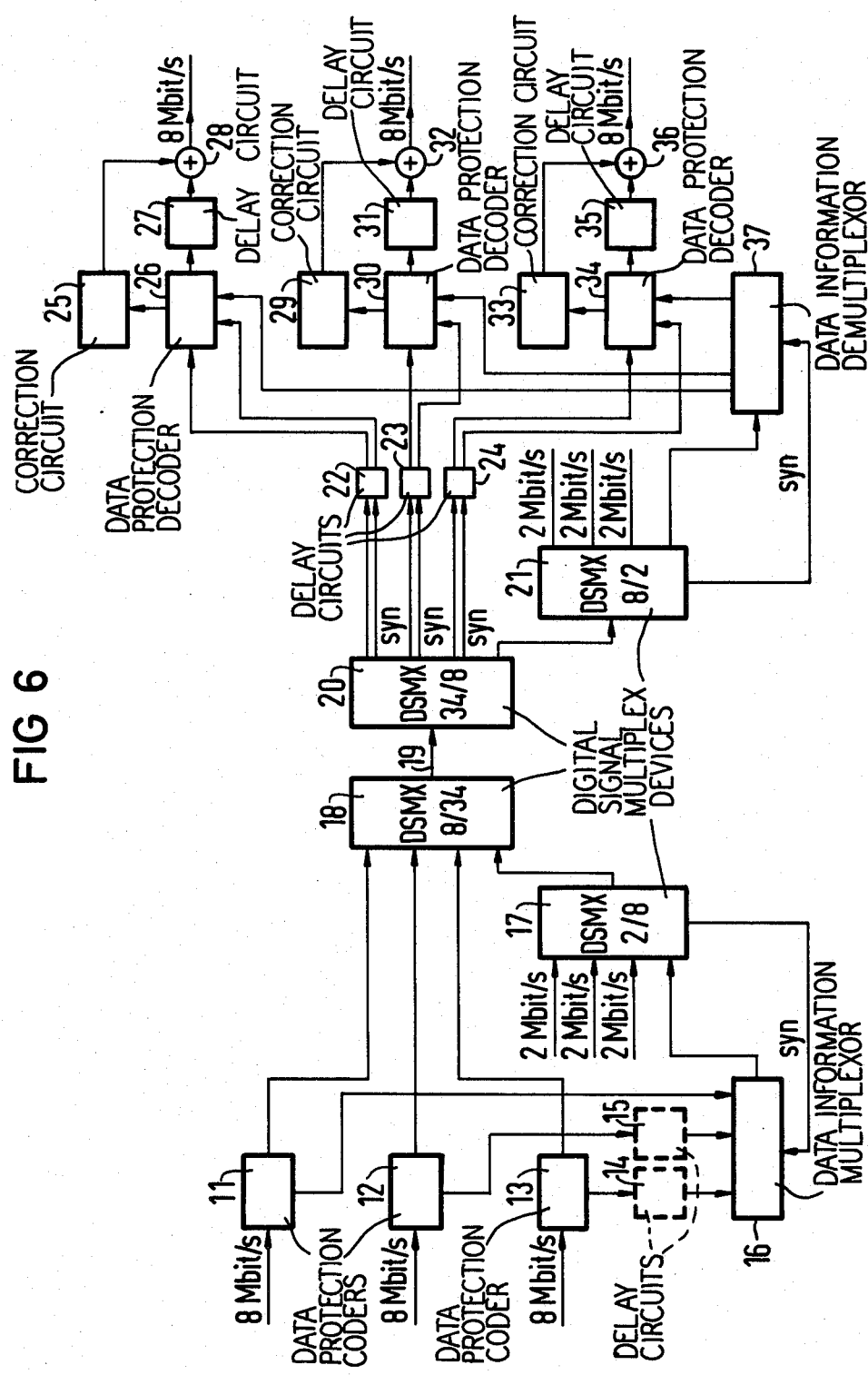
FIG. 6 is a schematic block diagram of a second embodiment of a digital signal multiplex device constructed in accordance with the principles of the present invention.

A further embodiment of a system constructed in accordance with the principles of the present invention is shown in FIG. 6 wherein the data protection is undertaken preceding a data information multiplexer and following a data information demultiplexer. The transmitting portion of the system shown in FIG. 6 constitutes components 11 through 18, and is connected via a transmission link 19 to the receiving portion of the system, constituting components 20 through 37.

The data protection coders 11, 12 and 13 are integrated circuits of the type described above found in the Am 9520 handbook. The output of the coder 11 is supplied directly to a data information multiplexer 16. The outputs of the coders 12 and 13 are also supplied to the multiplexer 16, possibly through respective delay circuits 14 and 15 if required. The output of the multiplexer 16 serves as one input to a digital signal multiplex device 17, the output of which serves as one input to another digital signal multiplex device 18, having the outputs of the data protection coders 11, 12 and 13 as its other inputs.

At the receiving portion of the system, the transmitted signal is supplied by a digital signal multiplex device 20 together with a synchronization signal to respective delay circuits 22, 23 and 24, and another output is supplied to a digital signal multiplex device 21. One output of the device 21 is supplied to a data information demultiplexer 37 together with a synchronization signal. The outputs of the delay circuits 22, 23 and 24 are respectively supplied to data protection decoders 26, 30 and 34. Each decoder also receives an input from the data information demultiplexer 37. The outputs of the decoders 26, 30 and 34 are respectively supplied to correction circuits 25, 29 and 33, as well as to further delay circuits 27, 31 and 35. The outputs of the correction circuit 25 and the delay circuit 27 are summed in an adder 28, the outputs of the correction circuit 29 and the delay circuit 31 are summed in an adder 32, and the outputs of the correction circuit 33 and the delay circuit 35 are summed in an adder 36.

In the embodiment shown in FIG. 6, three 8 Mbit/s input signals are subjected to data protection. The 8 Mbit/s signals are supplied to the data protection coders 11, 12 and 13 which each emit an item of data protection information to the multiplexer 16. Delay circuits 14 and 15 which may be provided ensure that the items of data protection do not arrive at the multiplexer simultaneously. From the items of data protection information, the multiplexer 16 forms a time division multiplex signal which is supplied to the fourth input of the digital signal multiplex device 17 which generates a synchronization signal which is supplied back to the multiplexer 16. The digital signal multiplex device 18 assembles the 3 Mbit/s signals from the coders 11, 12 and 13 and the output signal of the multiplex device 17.

At the receiving portion of the system, the digital signal multiplex device 20 again separates the 8 Mbit/s signals. The first three such signals are supplied through the delay circuits 22, 23 and 24 to data protection decoders 26, 30 and 34 which are also of the type described in the aforementioned handbook. The fourth 8 Mbit/s signal of the device 20 is supplied to the digital signal multiplex device 21 where it is divided into 2 Mbit/s signals. The fourth of these is supplied to the data information demultiplexer 37, which separates the three items of data protection and individually supplies these to the decoders 26, 30 and 34. The demultiplexer 37 obtains a synchronization signal syn from the digital signal multiplex device 21. The decoders 26, 30 and 34 are synchronized from the digital signal multiplex device 20.

In the United States, Canada and Japan a bit rate of 1.544 Mbit/s is utilized instead of 2.048 Mbit/s as is generally utilized in European countries, and a bit rate of 6.312 Mbit/s is utilized instead of 8.448 Mbit/s. In these countries, an item of data protection information can be transmitted without loss of useful information if a European transmission system of a higher bit rate is utilized, and the positions in the pulse format which are superfluous for the purpose of transmitting useful information are filled with data protection information.

Although modifications and changes may be suggested by those skilled in the art it is the intention of the inventor to embody within the patent warranted hereon all changes and modifications as reasonably and properly come within the scope of his contribution to the art.

I claim as my invention:

1. A digital signal multiplex system having a transmitting portion and a receiving portion, and a means for transmitting data therebetween, said transmitting portion comprising:
   a first transmitter digital signal multiplex device having a plurality of inputs to which digital data to be transmitted is supplied,
   a second transmitter digital signal multiplex device having a plurality of inputs to which digital data to be transmitted is supplied and an input connected to the output of said first transmitter digital signal multiplex device,
   a data protection coder having an input connected to the output of said second transmitter digital signal multiplex device,
   said data protection coder having a first output connected to one of the inputs of said first transmitter digital signal multiplex device and a second output connected to said means for transmitting data to said receiver portion; and said receiver portion comprising:
   a data protection decoder having an input connected to said means for transmitting data for receiving the output of said data protection coder, said data protection decoder having first and second outputs and an additional input,
   a delay circuit connected to said first output of said data protection decoder,
   a correction circuit connected to said second output of said data protection decoder for investigating the transmitted data for errors,
   an adder for summing the outputs of said delay circuit and said correction circuit,
   a first receiver digital signal multiplex device having an input connected to the output of said adder, said first receiver digital signal multiplex device having a plurality of digital signal outputs,
   a second receiver digital signal multiplex device having an input connected to one of the outputs of said first receiver digital signal multiplex device and having a plurality of digital signal outputs, one of said outputs of said second receiver digital signal multiplex device being connected to said additional input of said data protection decoder.

2. A digital signal multiplex system as claimed in claim 1 wherein said second transmitter digital signal mutliplex device generates a synchronization signal at an output thereof, and wherein said data protection coder has a block synchronization signal input connected to said synchronization signal output.

3. A digital signal multiplex system as claimed in claim 1 wherein said first receiver digital signal multiplex device generates a synchronization signal at an output thereof, and wherein each of said delay circuit and said data protection decoder have a block synchronization signal input connected to said synchronization signal output.

4. A digital signal multiplex system having a transmitter portion and a receiver portion, said transmitter portion comprising:
   a plurality of data protection coders each receiving digital data to be transmitted and having first and second outputs,
   a data information multiplexer having a plurality of inputs respectively connected to said first outputs of said data protection coders,
   a first transmitter digital signal multiplex device having a plurality of inputs for receiving digital data to be transmitted and an input connected to the output of said data information multiplexer,
   a second transmitter digital signal multiplex device having a plurality of inputs respectively connected to the second outputs of said data protection coders and an input connected to the output of said first digital signal multiplex device, said second transmitter digital signal multiplex device having an output connected to a data transmission means connected to said receiver portion; and said receiver portion comprising:
   a first receiver digital signal multiplex device connected to said data transmission means for receiving the output of said second transmitter digital signal multiplex device, said first receiver digital signal multiplex device having a plurality of outputs,
   a second receiver digital signal multiplex device having an input connected to one of said outputs of said first receiver digital signal multiplex device and having a plurality of digital signal outputs,
   a data information demultiplexer having an input connected to one of said outputs of said second receiver digital signal multiplex device and having a plurality of outputs, a plurality of receiver delay circuits respectively connected to the remaining outputs of said first receiver digital signal multiplex device, a plurality of data protection decoders respectively connected to the outputs of said delay circuits and each having an input respectively connected to the outputs of said digital information demultiplexer, a plurality of correction circuits respectively connected to the outputs of said data protection decoders for correcting errors in the transmitted data, a plurality of additional receiver delay circuits respectively connected to the outputs of said data protection decoders so as to be associated with the correction circuit connected to the same data protection decoder, a plurality of adders each having an input connected to the output of one of said additional receiver delay circuits and an input connected to the output of the correction circuit associated therewith, each adder having a digital signal output.

5. A digital signal multiplex system as claimed in claim 4 further comprising a means interconnected between the outputs of said data protection coders and the inputs of said data information multiplexer for ensuring that the signals from said data protection coders do not arrive simultaneously at said data information multiplexer.

6. A digital signal multiplex system as claimed in claim 5 wherein said means interconnected between said data protection coders and said data information multiplexer is a delay means interconnected between at least one of said data protection coders and said data protection multiplexer.

7. A digital signal multiplex system as claimed in claim 4 wherein said first transmitter digital signal multiplex device generates a synchronization signal at an output thereof, and wherein said data information multiplexer has a block synchronization input connected to said sychronization signal output.

8. A digital signal multiplex system as claimed in claim 4 wherein said first receiver digital signal multiplex device generates a synchronization signal at a plurality of outputs thereof, and wherein each of said delay circuits has a block synchronization signal input respectively connected to said synchronization signal outputs.

9. A digital signal multiplex system as claimed in claim 7 wherein each of said data protection decoders has a block synchronization signal input and wherein said delay circuits have respective synchronization signal outputs for respectively transmitting the synchronization signal generated by said first receiver digital signal multiplex device with a delay to said data protection decoders.

10. A digital signal multiplex system as claimed in claim 4 wherein said second digital multiplex device generates a synchronization signal at an output thereof, and wherein said data information demultiplexer has a block synchronization signal input connected to said synchronization signal output.

* * * * *